March 30, 1965     R. J. AKERS, JR     3,175,433
DOUBLE-ACTING REVERSIBLE WRENCH
Filed June 29, 1961
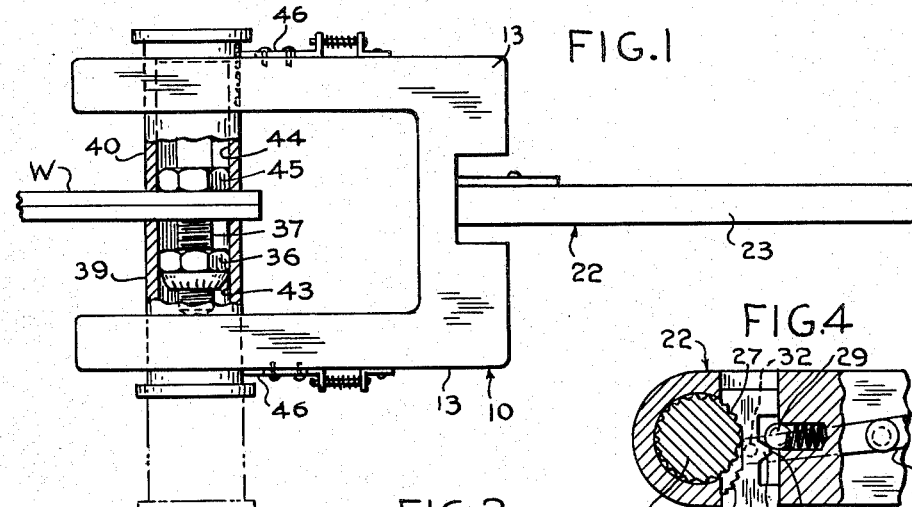
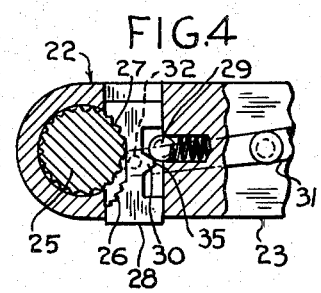
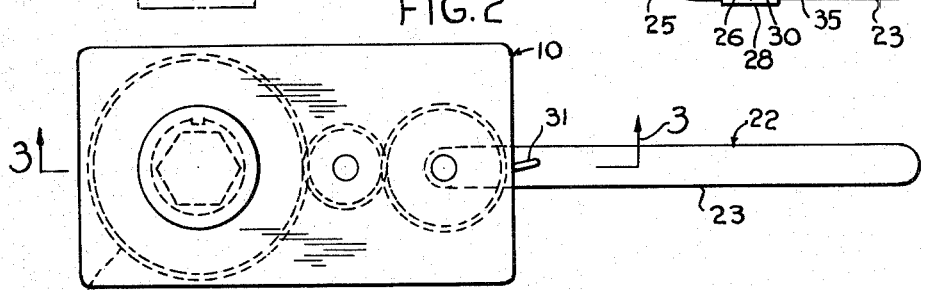
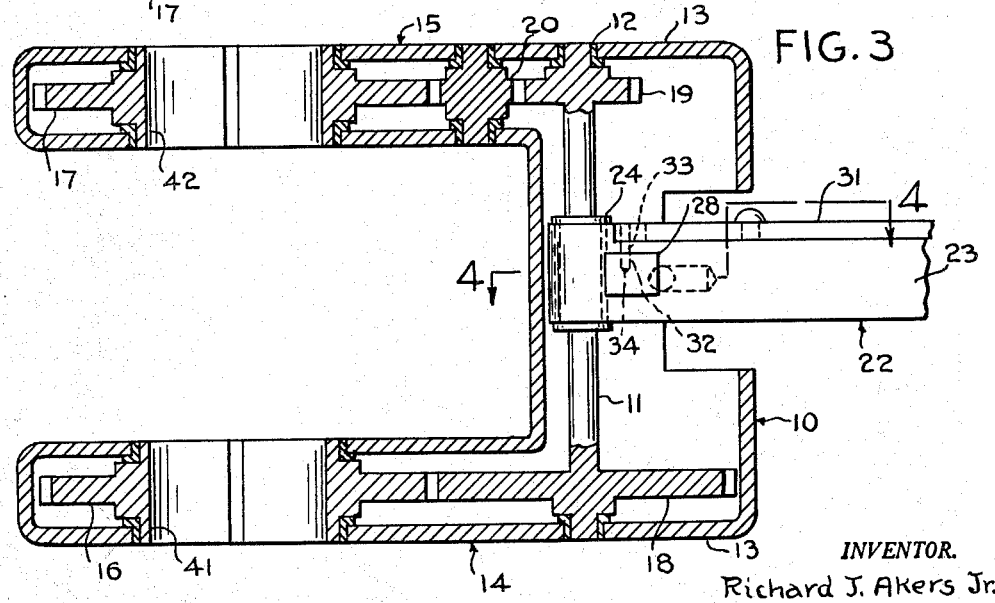
INVENTOR.
Richard J. Akers Jr.
BY *William Cleland*
Attorney

United States Patent Office 3,175,433
Patented Mar. 30, 1965

3,175,433
DOUBLE-ACTING REVERSIBLE WRENCH
Richard J. Akers, Jr., Cuyahoga Falls, Ohio
(1833 Hackett Ave., Long Beach 15, Calif.)
Filed June 29, 1961, Ser. No. 120,554
4 Claims. (Cl. 81—57)

This invention relates to hand tools, and in particular relates to a double-acting reversible wrench.

In the aircraft industry, as well as in other fields, certain types of self-locking bolts are commonly used. Bolts of this type have a general characteristic that as soon as the nut starts to be threaded onto the bolt the self-locking feature takes effect to resist relative turning of the nut, to the extent that it becomes necessary to use two separate wrenches for further tightening action, as otherwise the nut and bolt would turn in the same direction.

One object of the present invention is to provide a unitary tool adapted to span the work for rapidly turning the nut and bolt simultaneously in opposite directions, thereby obviating the usual necessity for awkward and sometimes impossible use of two wrenches, or employment of two persons for the operation.

Another object of the invention is to provide a tool of the character described which is adaptable to different thicknesses of work through which the bolts are received.

Still another object of the invention is to provide a tool of the character described having interchangeable turning means for bolts and nuts of various sizes.

These and other objects of the invention will be manifest from the following brief description and the accompanying drawings.

Of the accompanying drawings:

FIGURE 1 is a top plan view, partly broken away and in section, of a wrench embodying the features of the invention.

FIGURE 2 is a side elevation of the same.

FIGURE 3 is an enlarged cross-section, partly broken away, taken substantially on the line 3—3 of FIGURE 2.

FIGURE 4 is a fragmentary cross-section taken substantially on the line 4—4 of FIGURE 3, on the same scale, illustrating a reversing ratchet mechanism for manual operation of the wrench.

Referring to the drawings generally, and to FIGURE 3 in particular, the improved wrench includes a housing 10 within which a driving shaft 11 is rotatably mounted between bearings 12, 12 in laterally opposite walls 13, 13. The housing may have laterally spaced hollow extensions 14 and 15 adapted to span work W (see FIGURE 1), and having driven gears 16 and 17, respectively, rotatably mounted therein. Gear 16 may be driven at given speed or angular velocity by meshing with a relatively large gear 18 affixed on the shaft 11, while gear 17 is simultaneously driven at a slower speed or angular velocity in opposite direction, by a relatively small gear 19 on shaft 11, through a small intermediate idler gear 20 in housing extension 15. The axis of the shaft 11 extends laterally at right angles to the longitudinal axis of the housing, and the axis of the gears 16 and 17 is parallel to the axis of said shaft and in the same plane.

For manually progressively rotating the shaft 11, and consequently the gears 16 and 17, a reversible ratchet device 22 is provided. (See FIGURE 4.) This device may include a longitudinally extending handle 23 which has its inner end rotatably mounted on a central hub portion 24 of the shaft 11, the hub portion being shown as having a toothed shank 25 yieldingly selectively engageable by laterally spaced toothed faces 26 and 27 of a sliding pawl 28. The pawl 28 may be held in either said selectively engageable position by a spring-pressed ball 29 engaging with either of opposite sides of a central protuberance 30 on the pawl, and reversing adjustment may be accomplished by a lever 31 pivoted on the outer face of the handle 23, the lever having pin 32 on an inner free end thereof received through an arcuate slot 33 in the handle and projecting into a hole 34 centrally in the pawl 28. The pawl may be operated to a neutral or inoperative position with respect to the toothed shank 25 by positioning the pawl to stop the spring-pressed ball on the outer end 35 of central protuberance 30.

For turning a nut 36 and a bolt 37 in work W relatively of each other (see FIGURE 1), axially aligned, cylindrical socket members 39 and 40 are slidably keyed in cylindrical bores 41 and 42 of the gears 16 and 17, respectively, to have hexagonal sockets 43 and 44 presented oppositely inwardly for non-rotatable reception of the nut 36 and the head 45 of the bolt, as shown. Suitable spring-pressed detent means, 46, 46 are provided for adjustably restraining the socket members against axial movement with respect to the bolt and nut, as well as the work W.

In use of the improved wrench to tighten a nut 36, previously manually threaded as far as possible on bolt 37 on work W, the housing 10 is positioned to have extensions 13 thereof spanning or embracing the work as shown in FIGURE 1, but with the socket members 39, 40 adjusted axially outwardly, as shown in chain-dotted lines in FIGURE 1. After axially aligning the socket members with the bolt, they are adjusted inwardly to the full-line position of FIGURE 1, non-rotatably to receive the nut 36 and the bolt head 45 in sockets 43 and 44, respectively. The operator may thereupon support the housing 10 with one hand while reciprocating the ratchet handle 23 with the other hand, progressively to turn the shaft 11 in forward direction, and thereby through the respective meshing gears simultaneously to turn socket members 39 and 40 in opposite directions. Rotation of the socket members in this manner correspondingly turn nut 36 and the bolt 37 in opposite directions until they are fully tightened on work W. The socket members may then be adjusted outwardly to disengage bolt head 45 and the nut 36, and permit removal of the wrench from the work. Conversely, upon adjustment of the ratchet device 22 for reverse operation, as previously described, the wrench may be used for removing a bolt from work W.

The improved wrench is easily operated by one person to tighten or remove self-locking bolts on work of types which may be spanned by the housing extension 13 as described above, whereby problems previously encountered in use of prior art devices are obviated. That is, by simultaneously turning both the nut and the bolt in opposite directions, at different speeds, the tendency of the aforesaid self-locking feature to resist relative turning of the nut is obviated.

Modifications of the invention may be resorted to without departing from the spirit thereof or the scope of the appended claims.

What is claimed is:

1. A double acting wrench for relatively turning a bolt and nut or like work piece having opposite end turning portions, comprising; a housing having laterally spaced extensions; a pair of axially aligned gears mounted in said extensions to be laterally spaced and to be rotatable about a common axis, and having axially aligned openings therethrough; gear means in said housing and operable to rotate said aligned gears in opposite directions about the common axis; drive means on said housing remote from said aligned gears for driving said gear means; socket members interchangeably slidable in said gear openings from opposite outer sides of said spaced extension, whereby aligned said socket members are adjustable from and toward work received between said extensions; said socket members and gear openings having complemental means for keying the socket members to rotate with the respective aligned gears in all positions of sliding reception of the members in said gear openings; said socket members thereby being adapted to have internal work-turning means of different sizes, complementally to receive the opposite-end turning portions of the work piece when selected socket members are inwardly slidably received through the respective gear openings.

2. A wrench as in claim 1, means being provided for releasably retaining said socket members in selected positions of axial adjustment in said aligned gear openings.

3. A wrench as in claim 2, said gear means including a shaft rotatable to drive portions thereof in opposite directions, said drive means including a manually operable lever in selectively reversible ratcheting connection to said shaft.

4. A wrench as in claim 1, said gear means including a shaft rotatable to drive portions thereof in opposite directions, said drive means including a manually operable lever in selectively reversible ratcheting connection to said shaft.

References Cited by the Examiner
UNITED STATES PATENTS

| | | | |
|---|---|---|---|
| 598,831 | 2/98 | Wiley | 81—56 |
| 718,042 | 1/03 | Winters | 81—55 |
| 1,208,449 | 12/16 | Attawasser | 81—55 |
| 1,597,263 | 8/26 | Callison. | |
| 1,614,534 | 1/27 | Norton | 81—57 |
| 2,701,977 | 2/55 | Stone | 81—63.2 |

WILLIAM FELDMAN, *Primary Examiner.*